United States Patent [19]
Carlen

[11] Patent Number: 6,151,793
[45] Date of Patent: Nov. 28, 2000

[54] MOUNTING DEVICE FOR ALIGNING TWO ROTATING SHAFTS

[75] Inventor: Eric T. Carlen, Roanoke, Va.

[73] Assignee: Carlen Controls, Inc., Roanoke, Va.

[21] Appl. No.: 08/988,389

[22] Filed: Dec. 10, 1997

[51] Int. Cl.$^7$ .................................................. G01B 5/25
[52] U.S. Cl. .............................................. 33/645; 33/412
[58] Field of Search ............................. 33/645, 412, 529, 33/520, 613, 644, 533

[56] References Cited

U.S. PATENT DOCUMENTS

| | | | |
|---|---|---|---|
| 2,638,676 | 5/1953 | Callahan | 33/412 |
| 4,215,482 | 8/1980 | Szewczyk | 33/412 |
| 5,199,182 | 4/1993 | Fowler | 33/645 |
| 5,590,474 | 1/1997 | Lamb | 33/520 |

*Primary Examiner*—Christopher W. Fulton
*Attorney, Agent, or Firm*—Sterne, Kessler, Goldstein & Fox PLLC

[57] ABSTRACT

A rotational alignment device centers a shaft-mounted transducer on a rotating shaft. The alignment device includes a moveable base that is configured to receive the shaft-mounted transducer through a coupling device; a mounting base that connects to the rotating shaft; and a radial alignment assembly which connects the moveable base to the mounting base in a manner whereby the alignment error between the transducer and the rotating shaft can be corrected. The alignment error is corrected by making polar-coordinate type adjustments (i.e., correcting angular error and radial offset error) rather than traditional X-Y coordinate type adjustments.

13 Claims, 6 Drawing Sheets

MOUNTING DEVICE FOR ALIGNING TWO ROTATING SHAFTS

BACKGROUND OF THE INVENTION

1. Field of the Invention

This invention relates to a mounting device for centering an angular rotation transducer onto an output shaft of a drive motor.

2. Related Art

Large motors that operate in steel mills, paper mills, rubber mills, or other processing mills require precise speed control to control the rotational speed of the output shaft. Highly accurate transducers are required to provide near instantaneous feedback to the motor controller in order to maintain constant rpm of the output shaft of the motor. Once the precision of the transducer has been established, it is imperative that the center line of the transducer shaft be closely aligned with the center line of the motor shaft. A typical mill motor shaft includes a threaded hole pattern without the benefit of a pilot or counterbore to aid in centering.

Until recently, most feedback transducers were largely foot mounted arrangements, where the transducer shaft had to be aligned to the center line of the motor shaft by adjusting elevation, transverse direction, and runout of the transducer frame in order to achieve proper alignment. A transducer that was not aligned with the motor center line would generate a once-per-revolution error signal in addition to the relative speed feedback signal. The once-per-revolution error signal would then be amplified by a speed loop forward gain and would become the reference for the current loop, resulting in large torque disturbances in the closed loop system.

Shaft-mounted devices, such as that found in U.S. Pat. No. 5,048,384 to Carlen, use set screws at orthogonal axes to each other to center the base of the mandrel shaft that is ultimately connected to a measuring device such as a tachometer. A disadvantage of this type of centering device is that the centering process requires the loosening and tightening of four screws to move the mounting center on an angular trajectory.

What is needed is a system to center a feedback transducer where the center can be moved in a less complicated manner with only two adjustments.

SUMMARY OF THE INVENTION

The present invention is a rotational alignment device for centering shaft-mounted transducers on a rotating shaft to overcome the problem of having to recenter a transducer with Cartesian coordinate adjustments. The rotational alignment device includes a moveable base that is configured to receive the shaft-mounted transducer through a coupling device; a mounting base that connects to the rotating shaft; and a radial alignment assembly which connects the moveable base to the mounting base in a manner whereby the alignment error between the transducer and the rotating shaft can be corrected.

The alignment error is corrected by making polar coordinate type adjustments (i.e., correcting angular error and radial offset error) rather than the traditional X-Y coordinate type adjustments. A centering rail, disposed within a transverse passage in the moveable base, mates with the mounting base through a pilot-recess mating. The rail/moveable base combination may be rotated with respect to the mounting base to remove any angular offset error and a cam assembly used to adjust the moveable base with respect to the centering rail to remove the radial offset error. Once the angular and radial offset errors have been corrected, a clamp-down collar is tightened over the moveable base securing it to the mounting base. Once the alignment procedure has been accomplished, the mounting base can be adjusted for runout using the tilt screws.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENT

The preferred embodiment of the invention is discussed with reference to the figures in which like reference numbers indicate like elements. Furthermore, the left most digit of each reference number indicates the number of the figure in which the number is first referenced. While specific part numbers and configurations are discussed, it should be understood that this is done for illustration purposes only. A person skilled in the art will recognize that other Components and configurations may be used without departing from the spirit and scope of the invention.

The present invention is a device for aligning a first shaft with a second shaft for rotation about a common axis of rotation. In the preferred embodiment, the device of the invention is used to align the rotational centerline of a feedback traducer, such as a tachometer, with the rotational centerline of a motor shaft. For purposes of illustration, the invention is described with reference to this preferred embodiment.

Figure 1:
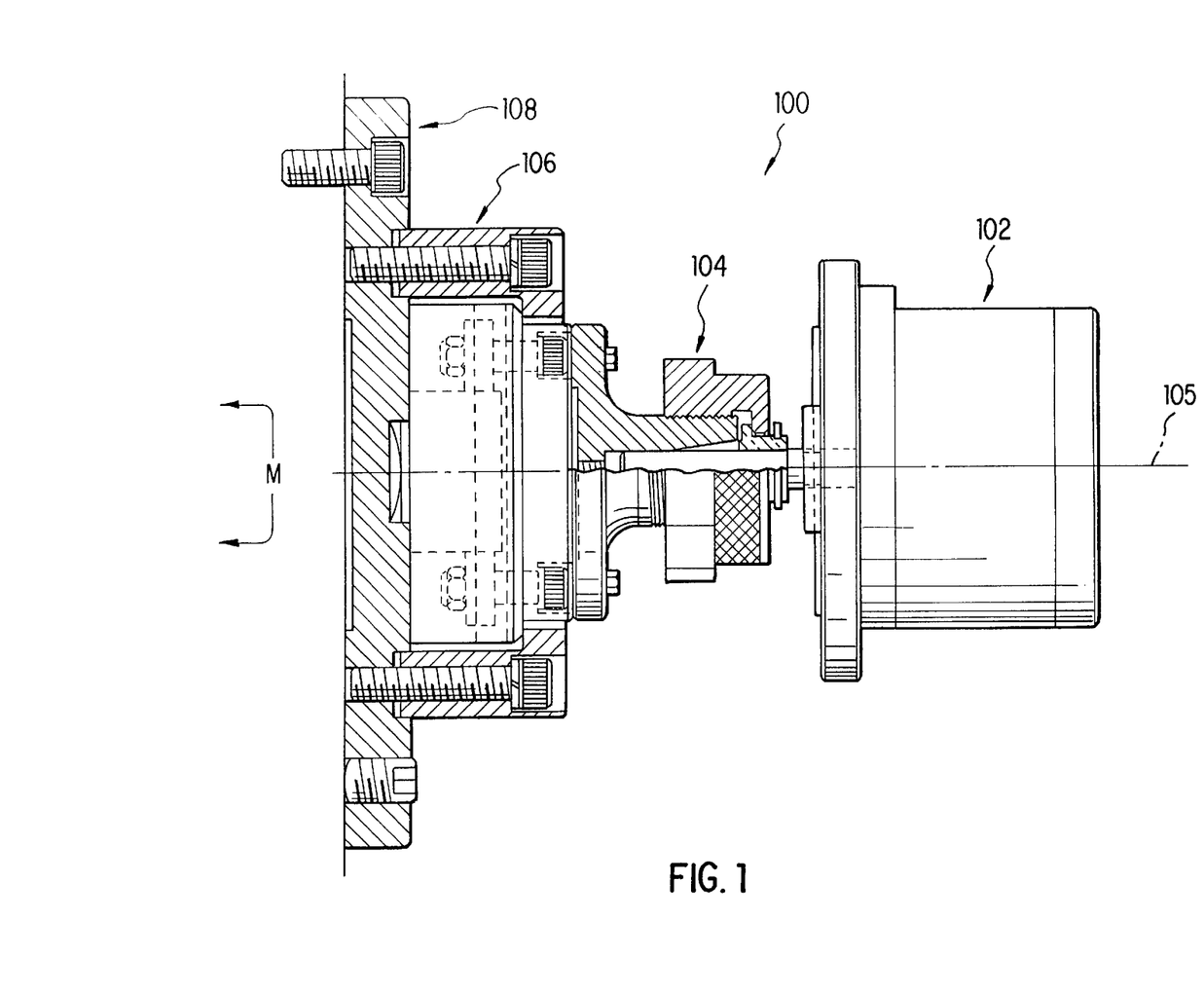
FIG. 1 a partially sectioned side view, illustrating the rotational alignment device of the invention attaching an angular rotation transducer to a motor shaft.

Referring to FIG. 1, a rotary mounting device 100 is shown mounting an angular rotation transducer 102 to a motor shaft M for rotation about a longitudinal axis 105. As illustrated, device 100 includes three subassemblies: a shaft mounting coupler 104, a radial alignment assembly 106, and a mounting base 108.

Figure 2:
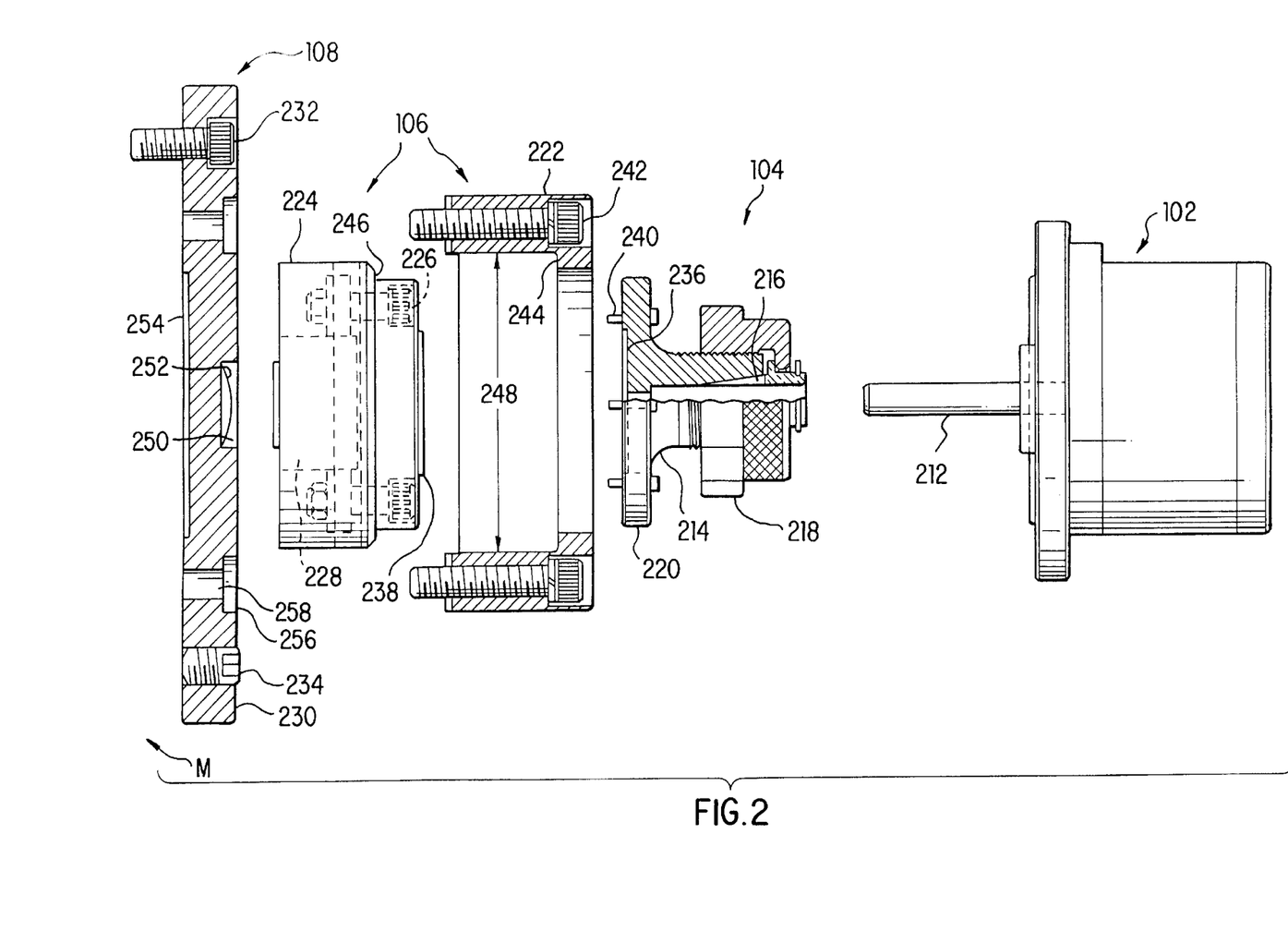
FIG. 2 is an exploded view of FIG. 1.

Referring now to FIG. 2, transducer 102 includes a transducer shaft 212. Coupler 104 includes a collar nut 218 and a receptacle 214 which has a tapered collar 216 and a mounting flange 220. Tapered collar 216 accepts shaft 212 and flange 220 mates with alignment assembly 106.

Alignment assembly 106 includes a clamp-down collar 222, a moveable base 224 with cam assemblies 226, and a centering rail 228. Alignment assembly 106 mates with mounting base 108.

Mounting base 108 consists of a mounting plate 230, mounting bolts 232, and tilt screws 234. Mounting base 108 mounts on motor shaft M.

TRANSDUCER-COUPLER

Shaft 212 of transducer 102 fits within tapered collar 216 on coupler 104. Tapered collar 216 provides a tight, on-center fit between coupler 104 and shaft 212. The tapered collar design maintains accurate centering during mounting and removal of a transducer 102. By contrast, the conventional set screw type coupling moves the coupling hub off of center as the set screws are tightened during installation of a transducer.

Once shaft 212 is placed in tapered collar 216 of receptacle 214, and nut 218 is tightened, transducer 102 is ready to be connected electrically and is on-line in a very short period of time as compared to a conventional foot-mounted transducer. Additionally, the mounting approach of the invention allows any transducer 102 to be removed and replaced without requiring realignment.

Figure 3:
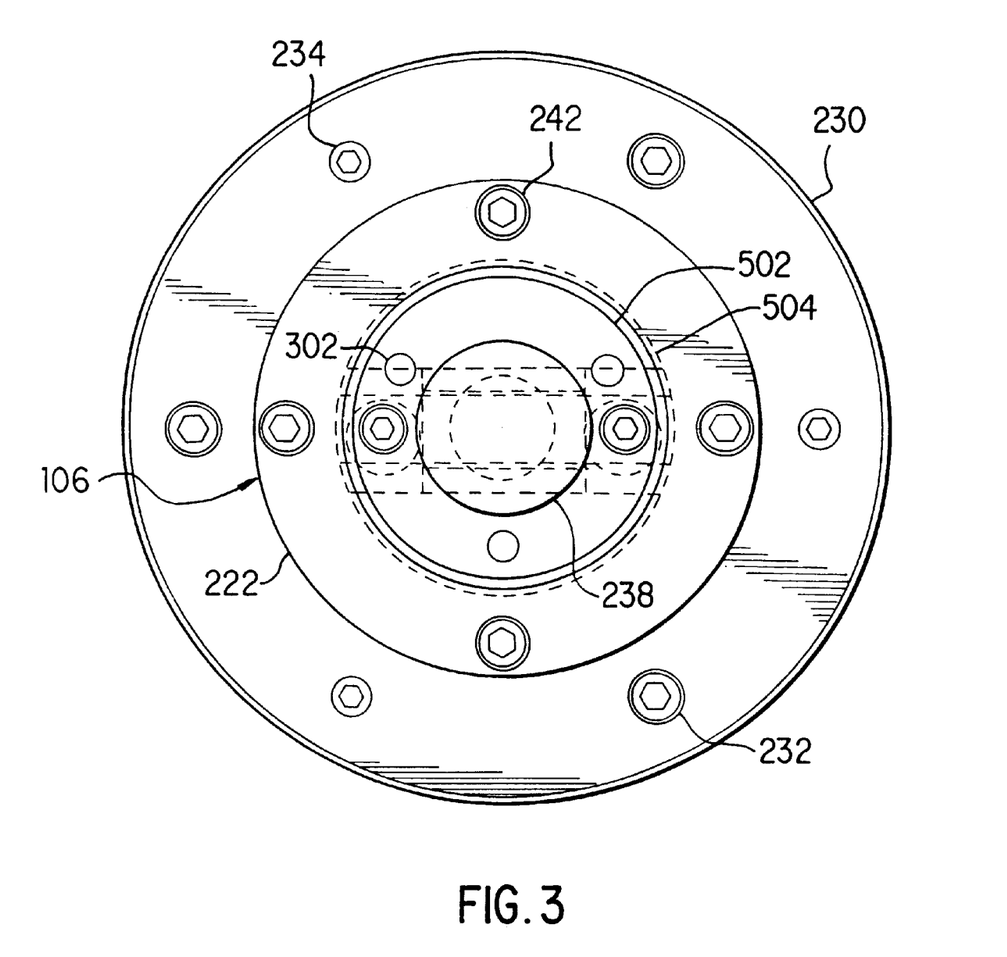
FIG. 3 is a top view of a radial alignment assembly of the rotational alignment device as attached to a mounting base.
Figure 4A:
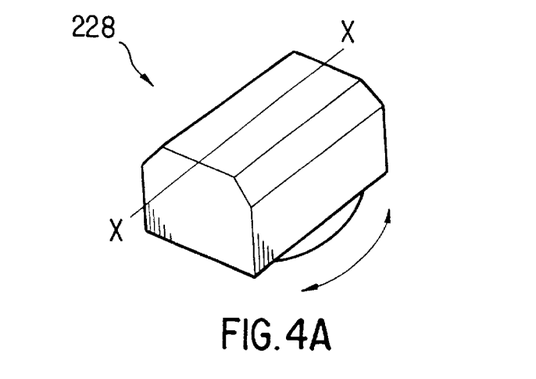
FIG. 4A is a perspective view of a centering rail of the rotational alignment device of the invention.
Figure 4B:
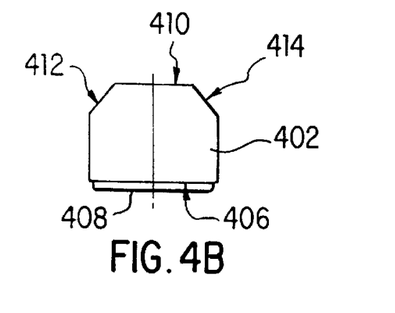
FIG. 4B is an end view illustrating the cross-sectional shape of the centering rail.
Figure 4C:
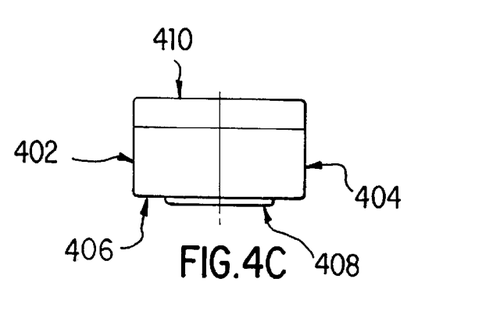
FIG. 4C is a side view of the centering rail.
Figure 4D:
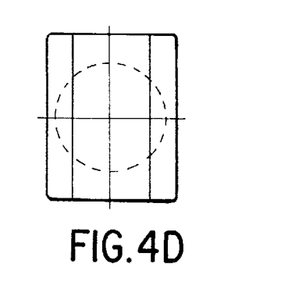
FIG. 4D is a top view of the centering rail.
Figure 4E:
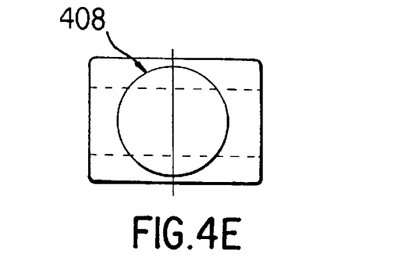
FIG. 4E is a bottom view illustrating a pilot of the centering rail.

Flange 220 of receptacle 214 is configured with three fasteners 240 that will fit into corresponding tapped holes 302 in moveable base 224 of assembly 106. Flange 220 provides a substantially flat surface to mate with assembly 106 and within the flat surface, there is a countersunk hole 236 to accept a pilot 238 from assembly 106. A combination of countersunk hole 236 and pilot 238 provides for an accurate centering of coupler 104 and assembly 106.

RADIAL ALIGNMENT ASSEMBLY

Assembly 106 is comprised of collar 222, moveable base 224, rail 228, and cam assemblies 226.

CLAMP DOWN COLLAR

Clamp-down collar 222 of assembly 106 is an annular ring which has a thickness large enough to accept clamp-down screws 242. Clamp-down screws 242 secure assembly 106 to mounting base 108. Clamp-down collar 222 also has a lip 244 which engages a shoulder 246 of moveable base 224. A central opening 248 of clamp-down collar 222 is configured to receive moveable base 224.

Figures 5A, 5B, 5C:
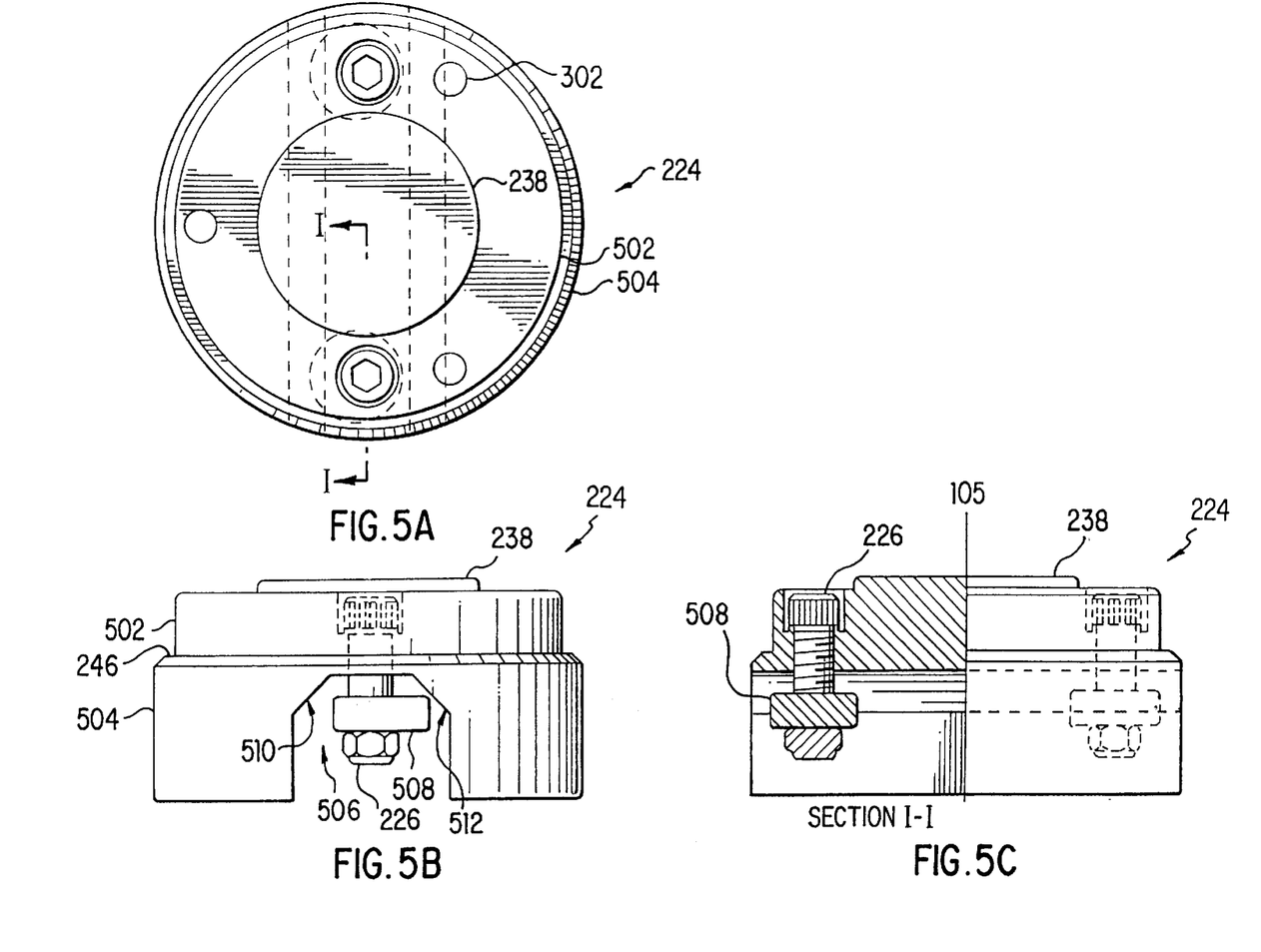
FIG. 5A is a top view of the moveable base of the alignment assembly, illustrating positioning of the cam assemblies within a transverse passage of the moveable base.
FIG. 5B is a side view of the moveable base of the alignment assembly, illustrating a transverse passage through the moveable base and the positioning of the cam assemblies therein.
FIG. 5C is a side view of the moveable base of the alignment assembly, shown partially in section along line A—A of FIG. 5A.
Figure 6:
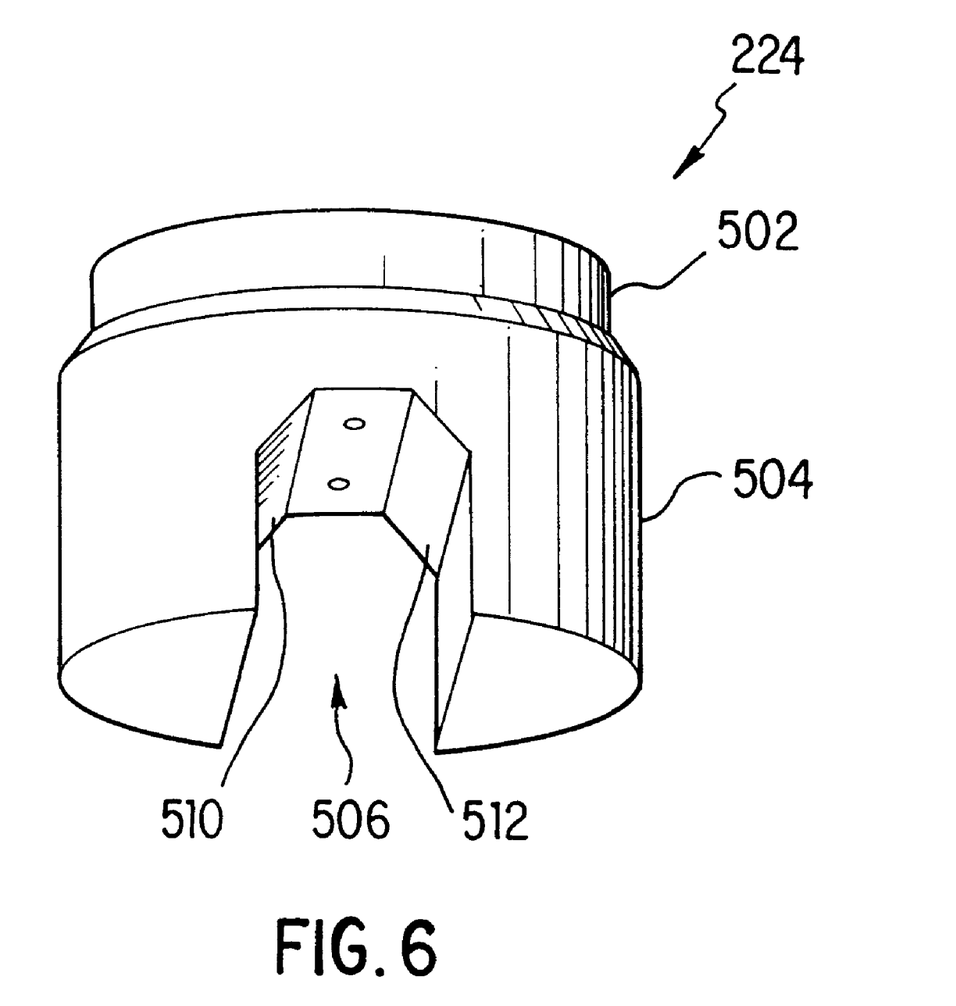
FIG. 6 is a perspective view of the moveable base without the centering rail in place.

Referring to FIGS. 2 and 5, moveable base 224 itself is generally cylindrical defining a first portion 504 of a larger diameter and a second portion 502 of a reduced diameter. The transition area between the two diameters of moveable base 224 forms a shoulder 246. Shoulder 246 is engaged by lip 244 of clamp-down collar 222. Portion 504 has a transverse passage 506 that runs across the entire diameter of moveable base 224. It is passage 506 that accepts rail 228. Cam assemblies 226 run from portion 502 into passage 506 of cylinder 504. It is in passage 506 that cams 508 of cam assemblies 226 engage rail 228 to perform the radial alignment function. Portion 502 (the portion closer to coupler 104) also has a pilot 238. Pilot 238 engages with countersunk hole 236 on flange 220 of receptacle 214.

CENTERING RAIL

Referring to FIG. 4, in the preferred embodiment, rail 228 is a prismoid with two substantially identical polygon ends 402, 404 and six sides. Polygon ends 402 and 404 as shown in this embodiment, are irregular hexagons and sides 406, 410, 412, 414, etc. are parallelograms. Referring also to FIG. 2, first side 406 is closest to mounting base 108 and contains a pilot 408 which engages with a recess 250 in mounting base 108. Second side 410 of rail 228 is parallel to first side 406 and is closest to coupler 104. Third and fourth sides 412 and 414 of rail 228 are neither parallel nor perpendicular to first or second sides 406 and 410.

MOVEABLE BASE

Referring to FIG. 5, passage 506 of moveable base 224 has a cross-section that is substantially identical to the shape of polygon ends 402 and 404 of rail 228 (shown in FIG. 4). Referring also to FIG. 2, when pilot 408 on first side 406 of rail 228 is in recess 250 of mounting base 108, a Belleville spring 252 within recess 250 presses against pilot 408, thereby pushing rail 228 up into passage 506 forming a "keystone-like" fit. This keystone-like fit causes third and fourth sides 412 and 414 of rail 228 to fit securely against the corresponding sides 510 and 512 of passage 506, thus preventing side-to-side movement of rail 228 with respect to moveable base 224. However, moveable base 224 and rail 228 can move with respect to each other along the axis of passage 506.

CAM ASSEMBLIES

FIG. 5 shows cam assemblies 226 of moveable base 224 extending into passage 506 where cams 508 engage polygon ends 402 and 404 of rail 228 (see FIG. 4). Adjustment of cam assemblies 226 causes rail 228 and moveable base 224 to move relative to each other.

MOUNTING BASE

Mounting base 108 mounts onto motor shaft M and includes a mounting counter-bore 254 which mates with a pilot (not shown) on motor shaft M, bolts 232 to secure plate 230 to the motor shaft M, and tilt screws 234 to adjust the relative orientation of the plane of plate 230 with respect to axis 105 of motor shaft M. Recess 250 of plate 230 includes spring 252. Recess 250 accepts pilot 408 (see FIG. 4) from rail 228 of assembly 106. In addition, the side of plate 230 closer to assembly 106 has a raceway 256 that is substantially circular.

The width of raceway 256 is substantially equal to the thickness of the annular ring of clamp-down collar 222. Within raceway 256, there are a number of holes 258 to receive clamp-down screws 242 that protrude through the annular ring of clamp-down collar 222. When clamp-down collar 222 is placed over moveable base 224, and clamp-down screws 242 are tightened into plate 230, lip 244 of clamp-down collar 222 engages shoulder 246 of moveable base 224, thereby securing moveable base 224 against mounting base 108. This tightening of clamp-down collar 222 and moveable base 224 against plate 230 occurs after centering has been accomplished.

ALIGNMENT METHOD

Aligning a transducer 102 to a motor shaft M in accordance with the invention includes two steps: (1) centering and (2) runout correction.

CENTERING

The centering of moveable base 224 is accomplished by a polar coordinate-type adjustment, which is described below. Once the high offset point of the center-line of transducer 102 has been determined with respect to the center-line of motor shaft M (e.g., by use of a machinist's dial gage located on the outside edge of pilot 238), assembly 106 is then adjusted. This adjustment, rather than taking out the error by adjusting the X and Y coordinates, makes the adjustment by using polar coordinate techniques. That is, moveable base 224 and rail 228 are rotated to take out the angular error, and then cam assemblies 226 are operated to move moveable base 224 with respect to rail 228, to take out the radial error. In this manner, the angular and radial errors are taken out (i.e., polar coordinate correction), and the center-line of transducer 102 will line up with the center-line of motor shaft M. Once the error has been taken out, clamp-down collar 222 is then tightened using clamp-down screws 242. Clamp-down collar 222 which engages moveable base 224 only through lip 244 and shoulder 246 will not affect the actual alignment of moveable base 224 because recess 250 of plate 230 and pilot 408 of rail 228 and the action of cam assemblies 226 against polygon bases 402 and 404 of rail 228 prevent movement of moveable base 224 with respect to motor shaft M.

Once the error between moveable base 224 and motor shaft M has been taken out, coupler 104 can then be mounted onto moveable base 224. Because of pilot 238 on moveable base 224 and counter-sunk hole 236 on flange 220 of receptacle 214, there will be no error in the center-line of coupler 104 and moveable base 224. Shaft 212 can then be engaged in coupler 104 using tapered collar 216 and nut 218. Because of tapered collar 216, there will be accurate alignment of shaft 212 with respect to coupler 104.

RUNOUT CORRECTION

Once the centering error has been taken out, tilt screws 234 on mounting base 108 are used to eliminate any error associated with the plane of plate 230 and axis 105 of motor shaft M. Typically, correcting the runout of the rotation is done subsequent to the centering of the transducer.

Once centering and runout correction have been accomplished, the entire mounting device has been centered on the motor shaft and we have the advantage of being able to change transducers without having the extensive downtime of re-centering the mounting device.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A rotational alignment device for centering a first rotating shaft on a second rotating shaft, the device comprising:
    (1) a mounting base configured for attachment to the second rotating shaft;
    (2) a moveable base configured to receive the first rotating shaft; and
    (3) radial alignment means for attaching said moveable base to said mounting base and for permitting polar coordinate-type adjustment of the position of said moveable base with respect to said mounting base.

2. A rotational alignment device for centering a first rotating shaft on a second rotating shaft, the device comprising:
    (1) a mounting base configured for attachment to the second rotating shaft;
    (2) a moveable base configured to receive the first rotating shaft; and
    (3) radial alignment means for attaching said moveable base to said mounting base and for permitting polar coordinate-type adjustment of the position of said moveable base with respect to said mounting base, wherein said radial alignment means comprises:
        (a) a clamp-down collar for attachment to said mounting base, said collar defining a central opening for receiving said moveable base therein;
        (b) a centering rail disposed within a transverse passage of said moveable base, said rail being substantially a prismoid having two substantially identical, polygon bases, said rail further mating with said mounting base to allow rotation of said rail with respect to said mounting base while preventing lateral movement of said rail with respect to said mounting base; and
        (c) a cam assembly disposed between said moveable base and one of said polygon bases of said centering rail, said cam assembly contacting said polygon base such that action of said cam assembly causes relative movement of said moveable base with respect to said centering rail within said central opening of said collar.

3. The rotational alignment device of claim 2, wherein said cam assembly comprises a plurality of cams attached to said moveable base.

4. The rotational alignment device of claim 2, wherein:
    said polygon bases of said centering rail are keystone shaped,
    said centering rail has a plurality of parallelogram sides, a first parallelogram side being substantially rectangular and having a pilot for mating with a recess in said mounting base, a second parallelogram side being substantially parallel to said first parallelogram side, and third and fourth parallelogram sides being neither parallel nor perpendicular to said first parallelogram side,
    said transverse passage of said moveable base has a cross section substantially identical to said polygon base of said centering rail, permitting said moveable base to move freely with respect to said centering rail, and
    said third and fourth parallelogram sides mate with corresponding sides of said transverse passage in a keystone-like fit.

5. The rotational alignment device of claim 4 wherein said polygon bases are trapezoids.

6. The rotational alignment device of claim 4 wherein said polygon bases are irregular hexagons.

7. The rotational alignment device of claim 4, further comprising:
    a shaft mounting coupling device for connecting said moveable base to the first rotating shaft.

8. The rotational alignment device of claim 7, wherein said shaft mounting coupling device comprises:
    a receptacle for accepting the first rotating shaft, said receptacle having a tapered collar and a mounting flange, said mounting flange mating with said moveable base; and
    a collar nut for securing said tapered collar onto the first rotating shaft.

9. The rotational alignment device of claim 8, wherein said mounting flange of said shaft mounting coupling device comprises a substantially flat surface having a plurality of fasteners and a counter-sunk hole to mate with said moveable base.

10. The rotational alignment device of claim 4, further comprising:
    clamp-down screw means for securing said clamp-down collar to said mounting base after adjustment of the relative position of said moveable base with respect to said mounting base by said radial alignment means.

11. The rotational alignment device of claim 10, wherein said clamp-down screw means comprises:
    an annular ring having a thickness sufficient to accept a plurality of clamp-down screws, said clamp-down screws causing said clamp-down collar to be engaged with said mounting base, said annular ring of said clamp-down collar having a lip, said lip engaging said moveable base, such that when said clamp-down screws are tightened, said moveable base is securely mated with said mounting base, and said annular ring of said clamp-down collar resting in a substantially circular raceway in said mounting base, said raceway having a width substantially equal to said thickness of said annular ring.

12. The rotational alignment device of claim 2, wherein said moveable base is configured to receive a shaft mounted transducer.

13. A rotational alignment device for centering a first rotating shaft on a second rotating shaft, the device comprising:

(1) a mounting base configured for attachment to the second rotating shaft;

(2) a moveable base configured to receive the first rotating shaft; and (3) a radial alignment assembly comprising:

(a) a clamp-down collar attached to said mounting base;

(b) a centering rail disposed within a transverse passage of said moveable base, said centering rail mating with said mounting base; and (c) a cam assembly protruding into said transverse passage and contacting said centering rail.

* * * * *